United States Patent [19]

Begrich

[11] 4,033,944
[45] July 5, 1977

[54] FIBER-REACTIVE HYDROXYCYCLOALKENYL-HALO TRIAZINYL CONTAINING DYESTUFFS

[75] Inventor: Rainer Begrich, Basel, Switzerland

[73] Assignee: Ciba-Geigy Corporation, Ardsley, N.Y.

[22] Filed: Apr. 14, 1975

[21] Appl. No.: 567,796

[30] Foreign Application Priority Data

Apr. 18, 1974 Switzerland .................... 5359/74

[52] U.S. Cl. ............................... 260/153; 260/143;
260/145 C; 260/146 T; 260/147; 260/148;
260/149; 260/150; 260/151; 260/157;
260/158; 260/162; 260/163; 260/169;
260/180; 260/187; 260/189; 260/190;
260/191; 260/194; 260/196; 260/198;
260/199; 260/205; 260/206; 260/242;
260/248 CS; 260/249; 260/249.5

[51] Int. Cl.² .................. C09B 29/36; C09B 31/00;
C09B 43/12; C09B 45/48

[58] Field of Search .......... 260/153, 146 T, 145 C, 260/147

[56] References Cited

UNITED STATES PATENTS 3,038,893   6/1962   Andrew et al. .................. 260/153 X

*Primary Examiner*—Charles F. Warren
*Attorney, Agent, or Firm*—Karl F. Jorda; Edward McC. Roberts; Michael W. Glynn

[57] ABSTRACT

Fiber-reactive dyestuffs of the formula

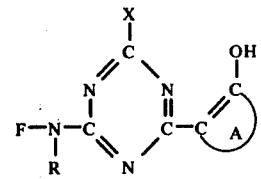

wherein

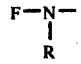

is a dyestuff radical, the ring A is cyclopentenyl, cyclohexenyl or cycloheptenyl, X is chloro, bromo or fluoro and R is hydrogen, lower alkyl, cyclohexyl or phenyl. These fiber-reactive dyestuffs are suitable for dyeing and printing silk, leather, wool, polyamide, polyurethanes, and cellulosic materials.

5 Claims, No Drawings

FIBRE-REACTIVE HYDROXYCYCLOALKENYL-HALO TRIAZINYL CONTAINING DYESTUFFS

The invention relates to fibre-reactive dyestuffs of the formula

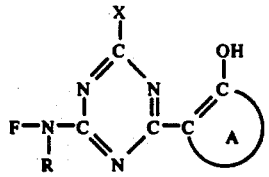  (1)

wherein F is the radical of a chromophore, R is hydrogen, alkyl or aryl, X is halogen and A is a carbocyclic radical.

By fibre-reactive dyestuffs there are to be understood those which are able to react with the hydroxyl groups of cellulose or with the amino groups of natural or synthetic polyamides to form covalent chemicals bonds.

The radical F in the formula (1) may originate from any of the known dyestuff categories and belongs preferably to the anthraquione, azo (monoazo, diazo and the like), phthalocyanine, formazane or nitroacryl series. Preferably, F contains at least one groups which confers solubility in water, especially a carboxylic acid group or sulphonic acid group. If desired, F can also contain coordinatively bound metal, for example copper, chromium or cobalt. Furthermore, F may also be the radical of a basic dyestuff.

The substituent R is, for example, a straight-chain or branched alkyl group, especially a low molecular alkyl group with 1 to 4 carbon atoms, such as methyl, ethyl, propyl or isopropyl, or an alkyl group of longer chain, such as hexyl, or a cycloalkyl group, such as cyclohexyl, or an aryl radical, such as phenyl. Preferably, R is hydrogen. X may be chlorine, bromine or fluorine. Preferably, X is a chlorine atom. The radical A is, for example, a 5-membered, 6-membered or 7-membered carbocyclic radical. Preferably, A is a 6-membered carbocyclic radical.

Accordingly, dyestuffs of particular importance are those of the formula

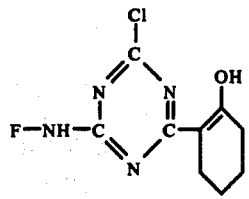  (2)

wherein F is preferably a radical of the anthraquinone, azo, phthalocyanine, formazane or nitroaryl series.

The fibre-reactive dyestuffs of the formula (1) are manufactured by acylating dyestuffs of the formula F—NH  (3)
|

wherein F and R have the meanings indicated under formula (1), with dihalogeno-s-triazines of the formula

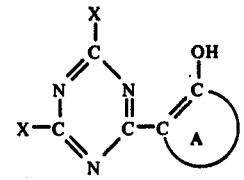  (4)

wherein X and A have the meanings indicated under formula (1).

The reactions of the dihalogeno-s-triazines of the formula (4) with the dyestuffs containing amino groups, of the formula (3), are suitably carried out in the presence of acid-binding agents, such as sodium carbonate or sodium hydroxide, and in organic solvents or at relatively low temperatures in aqueous media. In these reactions, the procedure to be followed is such that the finished product still retains one exchangeable halogen atom per triazine ring.

If the dyestuff radical F is made up of several components (as in the case of azo dyestuffs or formazane dyestuffs), the fibre-reactive dyestuffs of the formula (1) are also obtainable by synthesising them from components of F, of which one already contains the fibre-reactive halogeno-s-triazine radical. According to this procedure, components of the dyestuff of the formula (3), which contain an amino group of the formula —NH  (5)
|

wherein R has the meaning indicated under formula (1), are acylated with dihalogeno-s-triazines of the formula (4) and the resulting acylation products are combined with further components to give fibre-reactive dyestuffs of the formula (1). Thus, for example, a fibre-reactive azo dyestuff of the formula (1) can be manufactured by reacting a diazo component or a coupling component with a diahalogeno-s-triazine of the formula (4) and combining the resulting reactive interemediate compound with the requisite other component to give the finished dyestuff.

Examples of acylating agents which can be used are dihalogeno-s-triazines of the formula (4), wherein X is halogen and A is a 5-membered, 6-membered or 7-membered carbocyclic radical.

The preferred fibre-reactive dyestuffs of the formula (2) are manufactured by acylating dyestuffs of the formula F—NH  (6)

wherein F is a radical of the dyestuff of the anthraquinone, azo, phthalocyanine, formazane or nitroaryl series, with 2,4-dichloro-6-(cyclohexanon-2-yl)-s-triazine of the formula

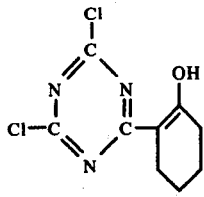

(7)

The dihalogeno-s-triazines of the formula (4) used as starting materials are known and can be manufactured according to known processes.

The following may be mentioned as examples: 2,4-dichloro-6(cyclohexanon-2-yl)-s-triazine, 2,4-dibromo-6-(cyclohexanon-2-yl)-s-triazine, 2,4-difluoro-6-(cyclohexanon-b 2-yl)-s-triazine, 2,4-dichloro-6-cycloheptanon 2-yl)-s-triazine and 2,4-dichloro-6-(cycloheptanon-2-yl)-s-triazine.

In the cycloalkanone radical A there is an equilibrium between the keto form and the enol form. However, this equilibrium is shifted largerly towards the enol form. Accordingly, the carbocycic radical A is predominantly present as the radical of a cycloalkenol. This has been expressed in all the formulae in the description, the examples and the claims. In designating the compounds in terms of names, the formulation as a radical of a cycloalkanone has been retained.

As is shown by the formula (1), the dyestuffs to be reacted with the dihalogeno-s-triazines of the formula (4) must contain at least one amino group which can be acylated, of the formula -NHR, wherein R denotes hydrogen, alkyl or aryl.

The dyestuff compounds of the azo series, containing at least one -NHR group, which are used as starting materials can be obtained in accordance with various processes. One process is to diazotise an aromatic primary amine and to couple the diazonium compound thus obtained with a coupling component containing a —NHR group. As examples of aromatic primary amines which can be used in this way to give aminoazo compounds there may be mentioned: aniline, o-, m- and p-toluidines, o-, m- and p-anisidines, o-, m- and p-chloroanilines, 2,5-dichloroaniline, α- and β-naphthylamine, 2,5-dimethylaniline, 5-nitro-2-aminoanisole, 4-aminodiphenyl, aniline-2-, -3- and -4-carboxylic acids, 2-aminodiphenyl ether, 2-, 3- or 4-aminobenzenesulphonamide or -sulphomonomethylamide or -sulphoethylamide or -sulphodimethylamide or -sulphodiethylamide, dehydrothio-p-toluidinemonosulphonic acid or dehydrothio-p-toluidinedisulphonic acid, aniline-2-,3- and -4-sulphonic acids, aniline-2,5-disulphonic acid, 2,4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3,4-dichloroaniline-6-sulphonic acid, 4-methylaniline-2-sulphonic acid, 3-methylaniline-6-sulphonic acid, 2,4-dimethyoxyaniline-6-sulphonic acid, 4-methoxyaniline-2-sulphonic acid and 5-methoxyaniline-2-sulphonic acid, 2,5-dichloraniline-4-sulphonic acid, 2-naphthylamine-4,8- and -6,8-disulphonic acid, 1-naphthylamine-2-, -4-, -5-, -6- or -7-monosulphonic acid, 1-naphthylamine-3,6-disulphonic acid, 2-naphthylamine-3,6- and -5,7-disulphonic acid, 2-naphthylamine-3,6,8-trisulphonic acid, m- and p-nitroaniline, 4-nitroaniline-2-sulphonic acid, 3-nitroaniline-6-sulphonic acid, m- or p-aminoacetanilide and 4-amino-2-acetylaminotoluene-5-sulphonic acid.

The following may be mentioned as examples of coupling components which can be used: 2-amino- and 2-methylamino-5-naphthol-7-sulphonic acid, 2-amino- and 2-methylamino-8-naphthol-7-sulphonic acid, 1-amino- and 1-ethylamino-8-napthol-6-sulphonic acid and corresponding 3,6-, and 4,6-disulphonic acids, 1-(3'- or 4'-aminobenzoylamino)-8-napthol-3,6- and -4,6-disulphonic acid, aniline, o- and m-anisidine, o- and m-toluidine, 2,5-dimethylaniline, 3-aminomethoxytoluene, 2,5-dimethoxyaniline, N-methylaniline, N-ethyl-o-toluidine, N-methyl-m-anisidine, 3-methylamino-4-methoxytoluene, 1-(3'-aminophenyl)-3-methyl-, -carboxy- and -carboethoxy-5-pyrazolone, 1-(4'-aminophenyl)-3-methyl-, -carboxy- and -carboethoxy-5-pyrazolone and 1-(4'-amino-3'-carboxyphenyl)-3-methyl-5-pyrazolone.

The aminoazo compounds to be used in the process according to the invention are not restricted to compounds containing merely one azo group. For example, disazo compounds can be obtained by tetrazotisation of an aromatic diamine containing two primary amino groups and coupling the tetrazo compound, thus obtained, with 2 molar proportions of one of the coupling components defined above or with 1 molar proportion of each of two of the coupling components defined above or with 1 molar proportion of one of the coupling components defined above and with 1 molar proportion of a coupling component not containing an amino group. The following may be mentioned as examples of such aromatic diamines: benzidine, 3,3'-dimethoxybenzidine, benzidine-2,2'-disulphonic acid, benzidine-3,3'-dicarboxylic acid, benzidine-3,3'-diglycollic acid and 4,4'-diaminostilbene-2,2'-disulphonic acid. Furthermore, diazo or polyazo compounds can be obtained by the use of primary aromatic amines or diamines containin azo groups. The following may be mentioned as examples of such primary aromatic amines or diamines containing azo groups: 4-aminoazobenzene-4'-sulphonic acid, 4'-amino-2'-methylphenylazo-3-naphthalene-4,8-disulphonic acid and 4-amino-5-methoxy-2-methyl-4'-nitro-2'-sulphoazobenzene.

Instead of starting from amines free from -NHR groups, it is also possible to couple a coupling component which optionally contains a —NHR group with a diazonium compound containing a —NHR group. Such diazonium compounds can be obtained in accordance with known processes by diazotisation of primary aromtic amines which contain a second amino group or a monosubstituted amino group. As examples of such primary aromatic amines there may be mentioned: p-phenylenediamine, 1,4-phenylenediamine-2-sulphonic acid, 1,4-phenylenediamine-2-carboxylic acid and 1,4-diaminonaphthal-ene-2-sulphonic acid. As examples of coupling components which can be used in this way there may be mentioned the coupling components listed above and also β-naphthol, 2-naphthol-6-or -7-sulphonic acid, 2-naphthol-3,6- or -6,8-disulphonic acid, 1-naphthol-4-sulphonic acid, 1-phenyl-3-methyl-5-pyrazolone, 1-(4'-sulphophenyl)-3-methyl-5-pyrazolone, 1-(2',5'-dichloro-4'-sulphophenyl)-3-methyl-5-pyrazolone, 2-benzoylamino-5-naphthol-7-sulphonic acid, 1-benzoylamino-8-naphthol-3,6- or -4,6-disulphonic acid, phenol, p-cresol, acetoacetanilide and acetoacet-2-methoxyaniline-5-sulphonic acid.

Further processes for the manufacture of the dyestuff compounds of the azo series which contains —NHR group and which can be used in the process according to the invention comprise reducing a dyestuff containing nitro groups or treating an azo or polyazo compound which contains at least one acylamino group with aqueous acid or aqueous alkali in order to hydrolyse off the acylamino group or groups. Such azo or polyazo compounds can be obtained from primary aromaic amines and/or coupling components which contain acylamino groups. As examples of such primary aromatic amines there may be mentioned: monoacetylbenzidine, 4-amino-1-acetylaminonaphthalene-6-sulphonic acid, 4-amino-4'-acetylaminodiphenyl-3-sulphonic acid, 4-amino-3-sulphoacetanilide, 3-amino-4-sulphoacetanilide and 4-amino-4'-acetylaminostilbene-2,2'-disulphonic acid, and as examples of such coupling components there may be mentioned 2-acetylamino-5-napthol-7-sulphonic acid, 2-N-acetyl-N-methylamino-5-naphthol-7-sulphonic acid, 2-acetylamino- and 2-N-acetyl-N-methylamino-8-naphthol-6-sulphonic acids and 1-acetylamino-8-naphthol-3,6-and -4,6-disulphonic acids.

As exampls of dyestuff compounds of the *antraquinone series*, which can be used as starting proucts in the process according to the invention, there may be mentioned: anthraquinone compounds which contain a group of the formula —NHR, defined above, bonded to an alkylamino or arylamino group, which is itself bonded to the α-position of the anthraquinone nucleus. As examples of such anthraquinone compounds there may be mentioned: 1-amino-4-(4'-aminoaniline)-anthraquinone-2,3'-disulphonic acid and the corresponding 2,3',5-, 2,3',6- and 2,3'7-trisulphonic acids, 1-amino-4-(4''-amino-4'-benzoylaminoaniline)-anthraquinone-2,3-disulphonic acid and the corresponding -2,3',5-trisulphonic acid, 1-amino-4-[4'-(4'''-aminophenylazo)-anilino]-antraquinone-2,2'',5-trisulphonic acid, 1-amino-4-(4'-amino-3'-carboxyanilino)-anthraquinone-2,5-disulphonic acid, 1-amino-4-(3'-aminoanilino)-anthraquinone-2,4',5-trisulphonic acid and the corresponding 2,4-disulphonic acid, 1-amino-4-[4'-(4'''-aminophenyl)-anilino]-anthraquinone-2,3'λ',5-trisulphonic acid, 1-amino-4-(4'-methylamino)-anilinoanthraquinone-2,3'-disulphonic acid and the corresponding 2,3',5-trisulphonic acid, 1-amino-4-(4'-n-butylamino)-anilinoanthraquinone-2,3'-disulphonic acid, 1-amino-4-(4'-methylamino-3'-carboxyanilino)-anthraquinone-2-sulphonic acid, 1-amino-4-(3'-β-hydroxyethylamino)-anilinoanthraquinone-2,5-disulphonic acid, 1-(4'-aminoanilino)-anthraquinone-2,3'-disulphonic acid and 1-amino-4-(4'-amino-2'-methoxyanilino)-anthraquinone-2,3'-disulphonic acid.

Such dyestuff compounds of the anthraquinone series can themselves be obtained from anthraquinone compounds which contain a halogen atom or a nitro group bonded to the corresponding α-position of the anthraquinone nucleus, or from the leuco-derivative of a 1,4—dihydroxy—, 1,4-diamino or 1,4-aminohydroxyanthraquinone by reaction of the corresponding anthraquinone compound with at least one molar proportion of an aliphatic or aromatic diamine.

Dyestuff compounds of the phthalocyanine series which can be used in the process according to the invention are preferably metal-containing phthalocyanines such as copper phthalocyanines, which contain at least one group which confers solubility in water, such as a sulphonic acid group, and at least one group of the formula —NHR, as defined above. The —NHR group or groups can be bonded to the benzene rings of the phthalocyanine nucleus directly or via a divalent bridge, for example via a —phenylene—, —CO—phenylene—, —SO₂—phenylene—, —NH—phenylene—, —S—phenylene—, —O—phenylene, —CH₂S—phenylene—, —CH₂O—phenylene—, —CH₂—phenylene—, —SCH₂—phenylene—, —SO₂CH₂—phenylene—, —SO₂NR₁—phenylene—, —CH₂—, —SO₂NR₁—arylene, —NR₁CO—phenylene—, —NR₁SO₂—phenylene—, —SO₂O—phenylene—, —CH₂—, —CH₂NR₁—phenylene—, —CH₂NH—CO—phenylene—, —SO₂NR₁—alkylene—, —CH₂NR₁—alkylene—, —CONR₁—phenylene—, —CONR₁—arylene—, —SO₂—or a —CO— bridge. In the abovementioned divalent bridge members, R₁ denotes hydrogen, alkyl or cycloalkyl, arylene denotes a divalent aromatic radical which is optionally substituted, for example by halogen, alkyl or alkoxy, and wherein the terminal bonds may be bonded to identical or different nuclei, and alkylene denotes a divalent aliphatic radical which may include heteroatoms, such as nitrogen, in the atom chain, for example the radical —CH₂CH₂—NH—CH₂CH₂—.

The following may be mentioned as examples of such divalent aromatic radicals which are designated as arylene: aromatic nuclei, for example a benzene, napthalene, acridine and carbazole nucleus, which can carry further substituents, and radicals of the formula

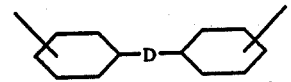

wherein the benzene rings can carry further substituents and —D— denotes a bridging group, for example —CH=CH—, —NH—, —S—, —O—, —SO₂—, —NO=N—, —N=N—, —NH—CO—NH—CO—NH—, —O—CH₂CH₂O— or

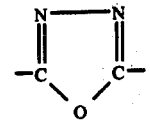

The following may be mentioned as particular examples of dyestuff compounds of the phthalocyanine series which can be used in the process according to the invention: copper phthalocyanine-4-N-(4-amino-3-sulphophenyl)-sulphonamide-4',4'', 4''''-trisulphonic acid, cobalt phthalocyanine-4,4'-di-N-(4'-amino-4'-sulphophenyl)-carboxylic acid amide-4'',4'''-dicarboxylic acid and copper-4-(4'-amino-3'-sulphobenzoyl)-phthalocyanine.

Mixtures of aminophthalocyanines can also be used. For example, a mixture of approximately equal parts of copper phthalocyanine-N-(4-amino-3-sulphophenyl)-sulphonamide-trisulphonic acid and copper-phthalocyanine-di-N-(4-amino-3-sulphophenyl)-sulphonamide-disulphonic acid can be used.

The aminophthalocyanines containing a sulphonic acid group can be obtained either by sulphonation of known phthalocyanines containing primary or secondary amino groups or by synthesis from mixtures of phthalic acid derivatives and sulphonated phthalic acid derivatives. Examples of sulphonating agents used are oleum, for example a 20% strength solution of sulphur trioxide in sulphuric acid. They can also be obtained by conjointly warming suitable derivatives of sulphonated phthalic acid and substituted phthalic acids in accordance with the generally known process, for example by conjoint warming of a mixture of 4-sulphophthalic anhydride and 4-p-nitrobenzoylphthalic anhydride, urea, copper-(II) chloride and ammonium molybdate in o-dichlorobenzene at about 150° C. Phthalocyanines which are used as starting materials can also be manufactured by sulphonation of the corresponding primary and secondary amines or by reaction of a primary (or secondary N—alkyl—or N—cycloalkyl—) nitroaniline with a phthalocyanine which contains chloromethyl groups and sulphonic acid groups or carboxylic acid groups. Furthermore, such aminophthalocyanines can also be manufactured by reaction of a phthalocyanine which contains chlorosulphonyl groups, with a monoacetylalkylenediamine or an amino-N-benzylacetamide in the presence of water, and treatment of the product thus obtained (which contains both sulphonamide and sulphonic acid groups) with aqeuous alkali to hydrolyse the acetylamino group, or by reaction of the phthalocyanine, which contains chloromethyl and sulphonic acid or carboxylic acid groups, with a monoacetylalkylenediamine and treatment of the product thus obtained with aqueous alkali to hydrolyse the acetylamino groups. Furthermore, they can be obtained by direct sulphonation or by conjoint warming of a mixture of suitable carboxy—or sulphophthalic acid derivatives with substituted phthalic acid derivatives, for example by warming the anhydrides with urea and a catalyst, in an organic solvent, and reduction of the nitrophthalocyanine-sulphonic acid or -carboxylic acid thus obtained, or hydrolysis of the acylaminophthalocyanine-sulphonic acid or -carboxylic acid thus obtained, or by reaction of a phthalocyanine compound which contains carboxylic acid chloride groups, with a diaminobenzene-sulphonic acid or -carboxylic acid, an aminobenzenesulphonic acid or an aminobenzoic acid, which also contains a nitro group, and finally by reaction of the phthylocyanine compound which contains carboxylic acid chloride groups with a N-aminobenzylacetamide and subsequent hydrolysis of the product, thus obtained, with aqueous alkali.

Dyestuff compounds of the nitro series which can be used in the process according to the invention are preferably those of the formula

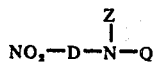

wherein D denotes a naphthalene or benzene nucleus which can be substituted further, the nitrogen atom N is in the orthoposition to the nitro group, Z denotes hydrogen or an optionally substituted hydrocarbon radical and Q denotes hydrogen or an organic radical bonded to the nitrogen by a carbon atom, and Q and Z are not both hydrogen, and Q can be bonded to Z, if Z is a hydrocarbon radical, or can be bonded to D in the ortho-position to the nitrogen atom N, to form a heterocyclic ring, and which contain at least one group of the formula —NHR, as defined above.

The compounds of the following categories may be mentioned as particular examples of dyestuff compounds which contain at least one —NHR group and which can be used as starting materials in the process according to the invention:

1. Monoazo compounds of the formula

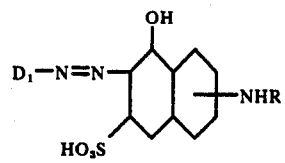

wherein $D_1$ denotes an at most bicyclic aryl radical free from azo groups and —NHR groups, and the —NHR group is preferably bonded to the 6-, 7- or 8-position of the napthalene nucleus, and which can obtain a sulphonic acid group in the 5- or 6- position of the napthalene nucleus.

$D_1$ can here denote a radical of the naphthalene or benzene series which does not contain any azo substituents, for example a stilbene, diphenyl, benzthiazoylphenyl or diphenylamine radical. In this category, attention should also be given to the related dyestuffs in which the —NHR group, instead of being bonded to the naphthalene nucleus, is bonded to a benzolylamino or anilino group which is bonded to the 6-, 7- or 8-position of the naphthalene nucleus.

Particularly valuable starting dyestuffs are those wherein $D_1$ denotes a sulphonated phenyl or naphthyl radical especially those which contain a —$SO_3H$ group in the ortho-position to the azo bond; the phenyl radical may be substituted further, for example by halogen atoms, such as chlorine, alkyl radicals, such as methyl, acylamino groups, such as acetylamino, and alkoxy radicals, such as methoxy.

2. Disazo compounds of the formula in category 1 wherein $D_1$ denotes a radical of the azobenzene, azonaphthalene or phenylazonaphthalene series and the naphthalene nucleus is substituted by the —NHR group and, if desired, by the sulphonic acid, as in category 1.

3. monoazo compounds of the formula

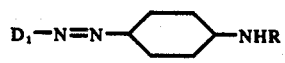

wherein $D_1$ denotes an at most bicyclic aryl radical, such as described in category 1, and preferably a disulphonaphthyl or stilbene radical, and the benzene nucleus can contain further substituents, such as halogen atoms or alkyl, alkoxy, carboxylic acid and acylamino groups.

4. Monoazo or disazo compounds of the formula

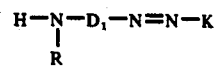

wherein $D_1$ denotes an arylene radical, such as a radical of the azobenzene, azonaphthalene or phenylazonaphthalene series, or preferably an at most bicyclic arylene radical of the benzene or naphthalene series, and K denotes the radical of a naphtholsulphonic acid or the radical of an enolised or enolisable ketomethylene compound (such as an acetoacetarylide or a 5-pyrazolone) with the OH group in the ortho-position to the azo group. $D_1$ preferably denotes a radical of the benzene series which contains a sulphonic acid group.

5. Monoazo or disazo compounds of the formula

wherein $D_1$ denotes a radical of the types defines for $D_1$ in categories 1 and 2 above and $K_2$ denotes the radical of an enolisable ketomethylene compound (such as acetoacetarylide or a 5-pyrazolone) with the OH group in the ortho-position to the azo group.

6. The metal complex compounds, for example the copper, chromium and cobalt complexes, of the dyestuffs of the indicated formulae, wherein $D_1$, K and $K_2$ have their respective indicated meanings and furthermore a metallisable group (for example a hydroxyl, lower alkoxy or carboxylic acid group) is present in the ortho-position to the azo group in $D_1$.

7. Anthraquinone compounds of the formula

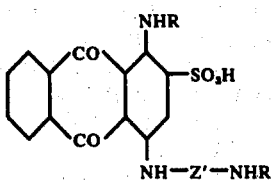

wherein the anthraquinone nucleus can contain an additional sulphonic acid group in the 5-, 6-, 7- or 8-position and Z' denotes a bridge member which is preferably a divalent radical of the benzene series, for example a phenylene, diphenylene, 4,4'-stilbene or 4,4'-azobenzene radical. Preferably, Z' should contain a sulphonic acid group in each benzene ring present.

8. Phthalocyanine compounds of the formula

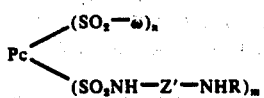

wherein Pc denotes a phthalocyanine nucleus, preferably copper phthalocyanine, ω denotes —OH and/or —NH$_2$, Z' denotes a bridge member, preferably an aliphatic cycloaliphatic or aromatic bridge, and n and m each denote 1, 2 or 3 and can be identical or different, provided that n + m does not exceed 4.

9. Nitro dyestuffs of the formula

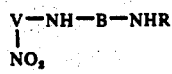

wherein V and B denote monocyclic aryl nuclei and the nitro group in V is in the ortho-position to the NH group.

The following are examples of possible starting dyestuffs in the dyestuff categories mentioned: In category 1:

6-Amino-1-hydroxy-2-(2'-sulphophenylazo)-naphthalene-3-sulphonic acid, 6-methylamino-1-hydroxy-2-(4'-acetylamino-2'-sulphophenylazo)-naphthalene-3-sulphonic acid, 8-amino-1-hydroxy-2-(2'-sulphophenylazo)-naphthalene-3,6-disulphonic acid, 8-amino-1-hydroxy-2-(4'-chloro-2'-sulphophenylazo)-naphthalene-3,5-disulphonic acid, 7-amino-2-(2',5'-disulphophenylazo)-1-hydroxynaphthalene-3-sulphonic acid, 7-methylamino-2-(2'-sulphophenylazo)-1-hydroxynaphthalene-3-sulphonic acid, 7-methylamino-2-(4'-methoxy-2'-sulphophenylazo)-1-hydroxynaphthalene-3-sulphonic acid, 8-(3'-aminobenzoylamino)-1-hydroxy-2-(2'-sulphophenylazo)-naphthalene-3,6-disulphonic acid, 8-amino-1-hydroxy-2,2'-azonaphthalene-1',3',5',6-tetrasulphonic acid, 8-amino-1-hydroxy-2,2'-azonaphthalene-1',3,5'-trisulphonic acid, 6-amino-1-hydroxy-2,2'-azonaphthalene-1',3,5'-trisulphonic acid, 6-methylamino-1-hydroxy-2,2'-azonaphthalene-1',3,5'-trisulphonic acid, 7-amino-1-hydroxy-2,2'-azonaphthalene-1',3-disulphonic acid, 8-amino-1-hydroxy-2-(4'-hydroxy-3'-carboxyphenylazo)-naphthalene-3,6-disulphonic acid and 6-amino-1-hydroxy-2-(4'-hydroxy-3'-carboxyphenylazo)-naphthalene-3,5-disulphonic acid. In category 2:

8-Amino-1-hydroxy-2-[4'-(2''-sulphophenylazo)-2'-methoxy-5'-methylphenylazo]-naphthalene-3,6-disulphonic acid, 8-amino-1-hydroxy-2-[4'-(4''-methoxyphenylazo)-2'-carboxyphenylazo]-naphthalene-3,6-disulphonic acid, 8-amino-1-hydroxy-2-[4'-(2''-hydroxy-3'',6''-disulpho-1''-naphthylazo)-2'-carboxyphenylazo]-naphthalene-3,6-disulphonic acid, 4,4'-bis-(8''-amino-1''-hydroxy-3'',6''-disulpho-2''-naphthylazo)-3,3'-dimethoxydiphenyl and 6-amino-1-hydroxy-2-[4'-(2''-sulphophenylazo)-2'-methoxy-5'-methylphenylazo]-naphthalene-3,5-disulphonic acid. In category 3:

2-(4'-Amino-2'-methylphenylazo)-naphthalene-4,8-disulphonic acid, 2-(4'-amino-2'-acetylaminophenylazo)-napthalene-5,7-disulphonic acid, 4-nitro-4'-(4''-methylaminophenylazo)-stilbene 2,2'-disulphonic acid, 4-nitro-4'-(4''-amino-2''-methyl-5''-methoxy-phenylazo)-stilbene-2,2'-disulphonic acid, 4-amino-4'-(4''-methoxyphenylazo)-stilbene-2,2'-disulphonic acid and 4-amino-2-methylazobenzene-2',5'-disulphonic acid. In category 4:

1-(2',5'-Dichloro-4'-sulphophenyl)-3-methyl-4-(3''-amino-4''-sulphophenylazo)-5-pyrazolone, 1-(4'-sulphophenyl)-3-carboxy-4-(4'-amino-3''-sulphophenylazo)-5-pyrazolone, 1-(2'-methyl-5'-sulphophenyl)-3-methyl-4-(4''-amino-3''-sulphophenylazo)-5-pyrazolone, 1-(2'-sulphophenyl)-3-methyl-4-(3''-amino-4''-sulphophenylazo)-5-pyrazolone, 4-amino-4'-(3''-methyl-1''-phenyl-4''-pyrazol-5''-onylazo)-stilbene-2,2'-disulphonic acid, 4-amino-4'-(2''-hydroxy-3'',6''-disulpho-1''-naphthylazo)-stilbene-2,2'-disulphonic acid, 8-acetylamino-1-hydroxy-2-(3'-amino-4'-sulphophenylazo)-naphthalene-3,6-disulphonic acid, 7-(3'-sulphophenylamino)-1-hydroxy-2-(4'-amino-2'-carboxyphenylazo)-naphthalene-3-sulphonic acid, 8-phenylamino-1-hydroxy-2-(4''-amino-2'-sulphophenylazo)-naphthalene-3,6-disulphonic acid and 6-acetylamino-1-hydroxy-2-(5'-amino-2'-sulphophenylazo)-naphthalene-3-sulphonic acid. In category 5:

1-(3'-Aminophenyl)-3-methyl-4-(2',5'-disulphophenylazo)-5-pyrazolone, 1-(3'-aminophenyl)-3-carboxy-4-(2'-carboxy-4'-sulphophenylazo)-5-pyrazolone, 4-amino-4'-[3''-methyl-4''-(2''',5'''-disulphophenylazo)-1''-pyrazol-5''-onyl]-stilbene-2,2'-disulphonic acid and 1-(3'-aminophenyl)-3-carboxy-4-[4''-(2''',5'''-disulphophenylazo)-2''-methoxy-5''-methylphenylazo]-5-pyrazolone. In category 6:

The copper complex of 8-amino-1-hydroxy-2-(2'-hydroxy-5''-sulphophenylazo)-naphthalene-3,6-disulponic acid, the copper complex of 6-amino-1-hydroxy-2-(2'-hydroxy-5'-sulphophenylazo)-naphthalene-3-sulphonic acid, the copper complex of 6-amino-1-hydroxy-2-(2'-hydroxy-5'-sulphophenylazo)-naphthalene-3,5-disulphonic acid, the copper complex of 8-amino-1-hydroxy-2-(2'-hydroxy-3'-chloro-5'-sulphophenyl)-naphthalene-3,6-disulphonic acid, the copper complex of 6-methylamino-1-hydroxy-2-(2'-carboxy-5'-sulphophenylazo)-naphthalene-3-sulphonic acid, the copper complex of 8-amino-1-hydroxy-2-[4'-(2''-sulphophenylazo)-2'-methoxy-5'-methylphenylazo]-naphthalene-3,6-disulphonic acid, the copper complex of 6-amino-1-hydroxy-2-[4'-(2'',5''-disulphophenylazo)-2'-methoxy-5'-methylphenylazo]-naphthalene-3,5-disulphonic acid, the copper complex of 1-(3'-amino-4'-sulphophenyl)-3-methyl-4-[4'''-(2''''', 5'''''-disulphophenylazo)-2'''-methoxy-5'''-methylphenylazo]-5-pyrazolone, the copper complex of 7-(4'-amino-3'-sulpho-anilino)-1-hydroxy-2-[4''-(2''''',5'''''-disulphophenylazo)-2'-methoxy-5''-methylphenylazo]-naphthalene-3-sulphonic acid, the copper complex of 6-(4'-amino-3'-sulphoanilino)-1-hydroxy-2-(2''-carboxyphenylazo)-naphthalene-3-sulphonic acid, the 1,2-chromium complex of 7-amino-6'-nitro-1,2'-dihydroxy-2,1'-azonaphthalene-3,4'-disulphonic acid, the 1,2-chromium complex of 6-amino-1-hydroxy-2-(2'-carboxyphenylazo)-naphthalene-3-sulphonic acid, the 1,2-chromium complex of 8-amino-1-hydroxy-2-(4'-nitro-2'-hydroxyphenylazo)-naphthalene-3,6-disulphonic acid, the 1,2-cobalt complex of 6-(4'-amino-3'-sulphoanilino)-1-hydroxy-2-(5''-chloro-2''-hydroxyphenylazo)-naphthalene-3-sulphonic acid, the 1,2-chromium complex of 1-(3'-amino-4'-sulphophenyl)-3-methyl-4-(2''-hydroxy-4'''-sulpho-1''-naphthylazo)-5-pyrazolone, the 1,2-chromium complex of 7-(4'-sulphoanilino)-1-hydroxy-2-(4''-amino-2''-carboxyphenylazo)-naphthalene-3-sulphonic acid and the 1,2-chromium complex of 1-(3'-aminophenyl)-3-methyl-4-(4''-nitro-2''-carboxyphenylazo)-5-pyrazolone. In category 7:

1-Amino-4-(3'-amino-4'-sulphoanilino)-anthraquinone-2-sulphonic acid, 1-amino-4-(4'-amino-3'-(4'-amino-3'-sulphoanilino)-anthraquinone-2,5-disulphonic acid, 1-amino-4-(4'-(4''-amino-3'-sulphophenyl)-anilino]-anthraquinone-2,5-disulphonic acid, 1-amino-4-[4'-(4''-amino-2''-sulphophenylazo)-anilino]-anthraquinone-2,5-disulphonic acid and 1-amino-4-(4'-methylamino-3-sulphoanilino)-anthraquinone-2-sulphonic acid. In category 8:

3-(3'-Amino-4'-sulphophenyl)-sulphamyl-copper phthalocyanine-tri-3-sulphonic acid, di-(4-(3'-amino-4'-sulphophenyl)-sulphamyl-copper phthalocyanine-di-4-sulphonic acid and 3-(3'-aminophenylsulphamyl)-3-sulphamyl-copper phthalocyanine-di-3-sulphonic acid. In category 9:

4-Amino-2'-nitro-diphenylamino-3,4'-disulphonic acid.

The new dyestuffs can be isolated and converted to usable dry dyeing preparations. They are preferably isolated at as a low a temperature as possible, by salting out and filtration. The filtered dyestuffs can be dried, if appropriate after addition of extenders and/or buffers, for example after addition of a mixture of equal parts of monosodium phosphate and disodium phosphate; preferably, the drying is carried out at temperatures which are not too high; and under reduced pressure. By spray drying of the entire mixture from the process of manufacture, the dry preparations according to the invention can in some cases be manufactured directly, that is to say without intermediate isolation of the dyestuffs.

The dyestuffs are suitable for dyeing and printing a great diversity of materials, such as silk, leather, wool, high molecular polyamide fibres and high molecular polyurethanes, but especially cellulosic materials of fibrous structure, such as linen, cellulose, regenerated cellulose and above all cotton. They are particularly suitable for dyeing by the exhaustion process from a dilute liquor, from an alkaline aqueous bath which optionally contains a large amount of salt, and by the pad-dyeing process, according to which the goods are impregnated with aqueous dyestuff solutions which optionally also contain salt and the dyestuffs are fixed after an alkali treatment or in the presence of alkali, if appropriate with heat treatment.

The dyestuffs are also suitable for printing, especially on cotton, but also for printing nitrogen-containing fibres, for example wool, silk or mixed fabrics containing wool.

The dyestuffs are distinguished by high reactivity, so that dyeings can be obtained at a lower temperature, or with a shorter fixing time, than are usually employed for comparable dyestuffs. An aspect to be singled out particularly is that the dyestuffs can be fixed rapidly and with high yield under cold conditions, that is to say, for example, at 40' C.

Further advantageous properties are good affinity and hence a high degree of fixing, good stability of the bond between the dyestuff and the fibre, ease of washing out the dyestuff which has not been fixed, and good build-up. The dyeings and prints obtained are very deeply coloured and have good fastness to light and very good wet fastness properties, such as, for example, good fastness to washing.

To improve the wet fastness properties it is advisable to subject the dyeings and prints to a thorough rinse with cold and hot water, if appropriate with addition of an agent which has a dispersing action and assists the diffusion of the parts of the dyestuff whih have not been fixed.

In the examples which follow, the parts, unless stated otherwise, denote parts by weight and the percentages denote percentages by weight. Parts by weight and parts by volume bear the same ratio to one another as that of the gram to the cubic centimeter.

EXAMPLE 1

71 parts of the copper complex of 8-amino-1-hydroxy-2-(1'-hydroxy-4',8'-disulphonaphthyl-2'-azo)-naphthalene-3,6-disulphonic acid are dissolved in 650 parts by volume of water under conditions which give a neutral solution. 16.5 parts of anhydrous sodium acetate are added, and a solution of 27 parts of 2,4-dichloro-6-(cyclohexanon-2-yl)-s-triazine in 250 parts by volume of acetone is then poured in all at once. The mixture is warmed to 40° C overnight, whilst stirring. The dyestuff is then precipitated by adding 75 parts of sodium chloride, and is thereafter filtered off and dried. The dye-stuff thus obtained, of the formula

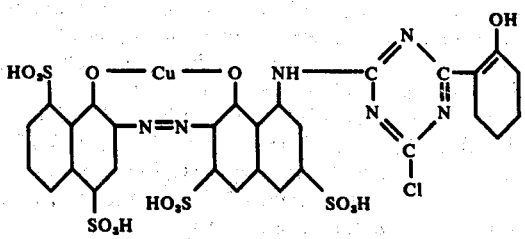

is highly reactive and rapid-fixing. The reddish-blue dyeings on cellulose have good general fastness properties.

EXAMPLE 2

43.6 parts of 2-(4'-amino-2'-ureido-phenylazo)-naphthalene-3,6,8-trisulphonic acid are dissolved in 520 parts by volume of water. The pH is adjusted to 7.0 with 5 N NaOH. A solution of 21.6 parts of 2,4-dichloro-6-(cyclohexanon-2'-yl)-s-triazine in 200 parts by volume of acetone is then poured in all at once and the whole is warmed to 40° C. At this temperature, the pH of the reaction mixture is kept constant at 5 to 6 by dropwise addition of 5 N NaOH. When no further sodium hydroxide solution is taken up and nonacylated dyestuff is no longer detectable, the product is separated out by means of 200 parts of sodium chloride and is then filtered off and dried. The dyestuff thus obtained, of the formula

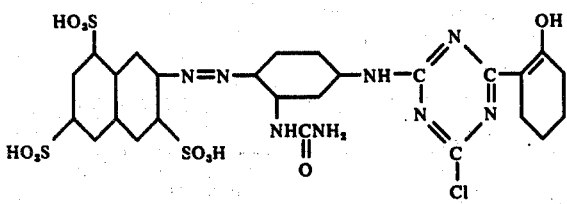

is an orange-yellow powder which acts as a highly reactive rapid-fixing reactive dyestuff for cotton and dyes the latter in a golden-yellow shade having good general fastness properties.

Instead of the sodium hydroxide solution in the above example, other basic substances, for example $Na_2CO_3$, KOH, $K_2CO_3$ and others, can be used with equally good success to bind the HCl formed in the reaction.

Reaction of 1 equivalent of the dyestuffs, containing amino groups, listed in column I of the table which follows, with 1 equivalent of 2,4-dichloro-6-(cyclohexanon-2'-yl)-s-triazine, gives dyestuffs which dye cotton in the shades indicated in column II.

EXAMPLE 3

80.2 parts of 2-(2'-phenylazo-1'-hydroxy-8'-naphthylamino)-4-(3'''-amino-anilino)-6-chloro-s-triazine-3',6',2'',4'''-tetrasulphonic acid in the form of a neutral moist paste, are dissolved in 1,250 parts by volume of water. 16.5 parts of anhydrous sodium acetate and a solution of 27 parts of 2,4-dichloro-6-(cyclohexanon-2'-yl)-s-triazine in 250 parts by volume of acetone are added and the whole is stirred overnight at 40° to 42° C. The product is then salted out by adding 250 parts of sodium chloride and the resulting precipitate is filtered off and dried.

The product thus obtained, namely 2-(2'-phenylazo-1'-hydroxy-8'-naphthylamino)-4-(3''''[2''''-chloro-4''''-cyclohexanon-2''''-yl-s-triazin-6''''-yl]-amino-anilino)-6-chloro-s-triazine-3',6',2'',4'''-tetrasulphonic acid dyes cotton in brilliant bluish-tinged red shades. The dyeings are very fast to acid and alkaline hydrolysis.

Reaction of 1 equivalent of the dyestuffs,, containing amino groups, listed in column I of the table which follows, with 1 equivalent of 2,4-dichloro-6-(cyclohexanon-2-yl)-s-triazine, analogously to the instruction in Example 3, gives dyestuffs which dye cotton in the shades indicated in column II.

|   | I | II |
|---|---|---|
| 1 | 1-Ethyl-4-methyl-5-(5'-[2''-chloro-4''-(3''''-amino-anilino)-s-triazin-6''-yl]-amino-phenylazo)-6-hydroxy-2-pyridone-3-carboxamide-2',4''''-disulphonic acid | Greenish-tinged yellow |
| 2 | 2-(2'-[4''-Methyl-phenylazo]-1'-hydroxy-8'-naphthylamino)-4-(4'''-amino-anilino)-6-chloro-s-triazine-3',6',2'',3'''-tetrasulphonic acid | Bluish-tinged red |
| 3 | 1-Amino-4-(3'-[2''-chloro-4''-(3'''-amino-anilino)-s-triazin-6''-yl]-amino-2',4',6'-trimethyl-anilino)-anthraquinone-2,6,5'-trisulphonic acid | Brilliant blue |

EXAMPLE 4

A neutral solution of 7.25 parts of m-phenylenediaminesulphonic acid in 250 parts by volume of water at room temperature and sufficient sodium hydroxide solution is prepared, and 5 parts of anhydrous sodium acetate are added. A solution of 7.4 parts of 2,4-dichloro-6-(cyclohexanon-2'-yl)-s-triazine in 70 parts of volume of acetone is added to the preceding solution, with vigorous stirring, and the mixture is left to react for about 24 hours. After clarifying the mixture by filtration, the reaction product is separated out by adding 20% by volume of potassium chloride and is dried in vacuo at 50° C.

7.9 parts of the amine thus obtained, of the formula

|   | I | II |
|---|---|---|
| 1 | 1-(2',5'-Dichloro-4'-sulphophenyl)-3-methyl-4-(5''-amino-2''-sulphophenylazo)-5-pyrazolone | Greenish-tinged yellow |
| 2 | 1-(2'-Chloro-5'sulphophenyl)-3-methyl-4-(4''-amino-2'',5''-sulphophenylazo)-5-pyrazolone | Yellow |
| 4 | 6-Methylamino-1-hydroxy-2-(2'-sulphophenylazo)-naphthalene-3-sulphonic acid | Orange |
| 5 | 4-(4''-Methylamino-phenylazo)-4'-(1''',2'''-naphthylene-triazole)-stilbene-2,2',5''', 7''''-tetrasulphonic acid | Orange |
| 6 | 8-Amino-1-hydroxy-2-(2'-sulphophenylazo)-naphthalene-3,5-disulphonic acid | Bluish-tinged red |
| 7 | 4-(4'-[Naphthyl-1-''-azo]-naphthyl-1'-azo)-naphthylamine-6,2'',5'',7''-tetrasulphonic acid | Brown |
| 8 | 4-(4'''-Aminonaphthyl-1'''-azo)-3,4',6'-trisulphoazobenzene | Brown |
| 9 | 1:2 Chromium complex of 2-(2'-hydroxyphenylazo)-6-amino-naphthol-3,4'-disulphonic acid | Brown-violet |

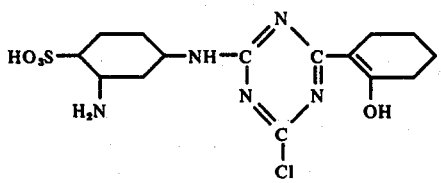

are dissolved in 200 parts of water and 10 parts of 2 N sodium nitrite solution and 5 parts of 10 N hydrochloric acid are added, whereupon the diazo compound precipitates in a partly crystalline form.

The resulting suspension of the diazo compound is then poured into the neutral solution of 8.5 parts of 1-hydroxy-8-benzoylamino-naphthalene-3,6-disulphonic acid in 50 parts of water which additionally contains 10 parts of sodium bicarbonate. After completion of coupling, the dyestuff is salted out with sodium Thereafter the diazo component prepared in the usual manner from 6.92 parts of orthanilic acid is added to the clear solution of the reactive coupling component obtained above.

After completion of coupling, the dyestuff formed is precipitated with a mixture of sodium chloride and potassium chloride, filtered off and dried in vacuo at 50° to 60° C.

The dyestuff thus obtained, dyes cotton in bluish-tinged red shades.

The table which follows lists the colour shades of further dyestuffs which are synthesised from the listed diazo components and coupling components of which the amino group is linked to the reactive components analogously to the data in Example 6, or are synthesises by reaction of the corresponding aminoazo dyestuffs with the reaction component, and which are dyed or printed onto cellulose materials in accordance with one of the processes described.

| | Diazo component | Coupling component | Colour shade |
|---|---|---|---|
| 1 | 1-Aminobenzene-2-sulphonic acid | 1-(3'-Aminobenzoylamino)-8-hydroxynaphthalene-3,6-disulphonic acid | Red |
| 2 | " | 2-Methylamino-5-hydroxynaphthalene-7-sulphonic | Orange |
| 3 | 1-Amino-4-acetyl-amino-2-sulphonic acid | " | Scarlet | chloride, filtered off and dried in vacuo at 60° C.

The dyestuff thus obtained dyes cotton in bluish-tinged red shaded.

If the diazo compound described above is combined with the coupling components of column I of the table which follows, dyestuffs which dye cotton in the shades indicated in column II are obtained.

| | I | II |
|---|---|---|
| 1 | 1-Ethyl-5-carbamyl-6-hydroxy-4-methyl-3-sulphomethyl-pyridone-(2) | Intense greenish-tinged yellow |
| 2 | Barbituric acid | Greenish-tinged yellow |
| 3 | 8-Acetylamino-1-hydroxynaphthalene-3,5,-disulphonic acid | Red |
| 4 | Acetoacetanilide-4-sulphonic acid | Greenish-tinged yellow |
| 5 | 1-(4'-Chlorophenyl)-3-methyl-5-pyrazolone-2',5'-disulphonic acid | Yellow |
| 6 | 2-Phenylazo-1-amino-8-naphthol-3,6,2',5'-tetrasulphonic acid | Greenish-tinged blue |

EXAMPLE 5

If the instruction of Example 4 is followed but instead of m-phenylenediaminesulphonic acid the corresponding amount of p-phenylenediaminesulphonic acid is employed and 1-hydroxy-8-benzoylamino-naphthalene-3,6-disulphonic acid is again used as the coupling component, a dyestuff is obtained which when applied in accordance with the customary methods dyes cellulose materials in fast strongly bluish-tinged red shades.

EXAMPLE 6

A clear solution is prepared from 12.76 parts of 1-hydroxy-8-amino-naphthalene-3,6-disulphonic acid in 250 parts of water at room temperature and sufficient sodium hydroxide solution, and 131.1 parts of anhydrous sodium acetate are added. A solution of 9.9 parts of 2,4-dichloro-6-(cyclohexanon-2'-yl)-s-triazine in 100 parts of acetone is added with vigorous stirring and the mixture is left to react for approx. 24 hours, until free amino groups are no longer detectable.

EXAMPLE 7

334.7 parts of the copper phthalocyanine derivative of the composition $$\left[ CuPc \begin{array}{c} -SO_3H \\ -SO_2NH_2 \end{array} \right]_{2.7} \left[ -SO_2NH-\bigcirc-SO_3H \atop NH_2 \right]_{1.5}$$

are stirred in 2,500 parts of water and neutralised by means of 40% strength sodium hydroxide solution. 108 parts of 2,4-dichloro-6-(cyclohexanon-2'-yl)-s-triazine are sprinkled in whilst stirring vigorously. The mixture is stirred for 4 hours at 40° C and the acid which is liberated is neutralised with 1 N sodium hydroxide solution. The mixture is then allowed to cool, and is filtered. If necessary, the filtrate is concentrated to the initial volume in a rotary evaporator in vacuo at approx. 40° C. The precipitate which separates out after cooling is collected on the filter. Further reaction product can be isolated from the filtrate by addition of sodium chloride. The product is dried, advantageously under reduced pressure. The dyestuff obtained dyes cellulose fibres in turquoise-blue shades.

EXAMPLE 8

If 7.27 parts of the dyestuff of the formula

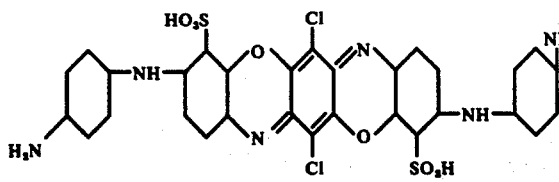

of which the manufacture is known and is described, for example, in French Patent Specification No. 1,116,564, are used, and the two amino groups are acylated with 2 equivalents of 2,4-dichloro-6-(cyclohexanon-2'-yl)-s-triazine in accordance with the data in Example 1, a dyestuff which dyes cotton in blue shades is obtained.

EXAMPLE 9

If 7.96 parts of the dyestuff of the formula

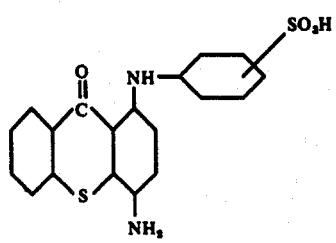

are used and the amino group is acylated, in accordance with the method indicated in Example 1, with 2,4-dichloro-6-(cyclohexanon-2'-yl)-s-triazine, a dyestuff which dyes cotton in yellow shades is obtained.

A yellow dyestuff is also obtained if instead of the thioxanthone dyestuff indicated, the thioxanthone dyestuff of the formula

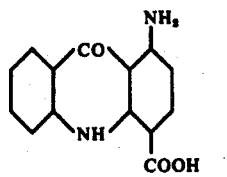

is used.

EXAMPLE 10

9.78 parts of the dyestuff of the formula

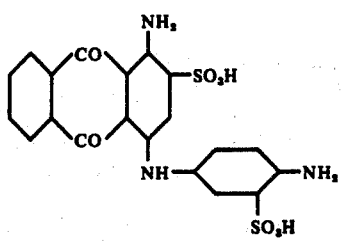

in 300 parts of water are neutralised with sodium hydroxide and 7 parts of anhydrous sodium acetate are added. Thereafter a solution of 4.92 parts of 2,4-dichloro-6-(cyclohexanon-2'-yl)-s-triazine in 50 parts of acetone is allowed to run in, whilst stirring. After 4 to 6 hours, the reaction mixture is adjusted to pH 8 with sodium carbonate and the dyestuff is salted out with sodium chloride, filtered off and dried. The dyestuff dyes cotton in greenish-tinged blue shades.

If 1 equivalent of the dyestuff listed in column I of the table which follows is used and is acylated in the manner indicated above, reactive dyestuffs which dye cotton in the colour shades indicated in column II are obtained.

| | I | II |
|---|---|---|
| 1 | ![structure] | Brilliantblue |
| 2 | ![structure] | Blue |
| 3 | ![structure] | Blue |
| 4 | ![structure] | |

EXAMPLE 11

52.4 parts of the sodium salt of 4-([4''-aminophenyl]-amino-2'-nitrodiphenylamine-3,4'-disulphonic acid are dissolved in 1,000 parts of water and stirred with 22.5 parts of 2,4-dichloro-6-(cyclohexanon-2'-yl)-s-triazine, dissolved in 200 parts of acetone, for one hour at 0° to 10° C. At the same time the acid liberated is continuously neutralised with sodium carbonate to a pH value of 6 to 7. The reactive nitro dyestuff formed, of the formula

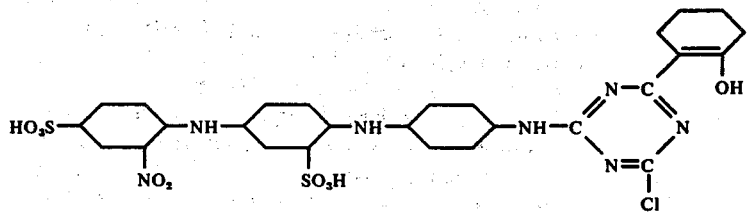

is salted out, filtered off, washed and dried. It dyes cellulose fibres from a dilute liquor or in accordance with one of the customary padding processes in the presence of sodium carbonate as the acid-binding agent, to give deep violet-brown shades which are fast to wet processing and to rubbing.

EXAMPLE 12

9.76 parts of 4-amino-4'-(4''-N-methylaminophenylazo)-stilbene-2,2'-disulphonic acid are dissolved in 200 parts of water, the pH value is adjusted to 6.5 with 10 N sodium hydroxide solution and 5.0 parts of 2,4-dichloro-6-(cyclohexanon-2'-yl)-s-triazine, dissolved in 50 parts of acetone, are added. The pH value is kept constant at 6.5 by adding 5 N sodium hydroxide solution. Towards the end of the reaction, the mixture is warmed to 30°–35° C. When free amino groups are no longer detectable, the bis-reactive dyestuff formed is salted out, filtered off and dried. A yellow powder is obtained, which dyes cotton in yellow shades of great fastness.

EXAMPLE 13

A clear solution is prepared from 12.76 parts of 1-hydroxy-8-aminonaphthalene-3,6-disulphonic acid in 250 parts of water at room temperature and sufficient sodium hydroxide solution, and 10 parts of anhydrous sodium acetate are added. A solution of 10.0 parts of 2,4-dichloro-6-(cyclohexanon-2'-yl)-s-triazine in 100 parts by volume of acetone is added thereto, with vigorous stirring, and the mixture is left to react for approx. 24 hours. At the same time a neutral solution is prepared from 7.5 parts of m-phenylenediaminesulphonic acid in 250 parts by volume of water at room temperature and sufficient sodium hydroxide solution, and 10 parts of anhydrous sodium acetate are added. A solution of 10.0 parts of 2,4-dichloro-6-(cyclohexanon-2'-yl)-s-triazine in 100 parts by volume of acetone is added to the resulting solution, with vigorous stirring, and the mixture is allowed to react for approx. 24 hours. The reaction product is clarified by filtration and 20 parts of 2 N sodium nitrite solution and 10 parts of 10 N hydrochloric acid are then added, whereupon the diazo compound partially precipitates in a crystalline form. The resulting suspension of the diazo compound is then poured into the solution of the coupling component whilst keeping the pH value at between 6 and 7 by simultaneously adding sodium hydroxide solution. After completion of coupling, the dye-stuff is salted out with sodium chloride, filtered off and dried in vacuo at 60° C. The bis-reactive dyestuff thus obtained dyes cotton in bluish-tinged red shades.

Bis-reactive dyestuffs can be synthesised, analogously to the instruction in Example 13, from the diazo components and coupling components listed in the table which follows; these dyestuffs, for example when used to dye cellulose materials in accordance with the dyeing processes mentioned later, give dyeings in the colour shades indicated in the table.

| | Diazo component | Coupling component | Colour |
|---|---|---|---|
| 1 | 2-Amino-5-(2'-chloro-4'-cyclohexanon-2''-yl)-s-triazin-6'-yl)-aminobenzenesulphonic acid | (2'-Chloro-4'-(8''-hydroxy-3'',6''-disulphonaphthyl)-amino-5-triazin-6'-yl)-cyclohexanone-2 | Red |
| 2 | 2-Chloro-4-(cyclohexanon-2'''-yl)-6-(3''-amino-4''-sulphophenyl)-amino-s-triazine | (2'-Chloro-4'-(2''-sulpho-''-(3'''-methyl-pyrazol-5''-onyl)-5'''-methylphenyl)-amino-s-triazin-6'-yl)-cyclohexanone-2 | Yellow |
| 3 | 2-Amino-5-(2'-chloro-4'-(cyclohexanon-2''-yl)-s-triazin-6'-yl)-aminobenzenesulphonic acid 4''',3''',6'''-trisulphonic acid | (2'-Chloro-4'-(3''-[1''',8'''-aminonaphthol-2'''-azo]-anilinno)-s-triazin-6'-yl)-cyclohexanone-2- | Greenish-tinged blue |

DYEING INSTRUCTION I 2 parts of the dyestuff obtained according to Example 1 are dissolved in 100 parts of water, with addition of 0.5 part of sodium m-nirobenzenesulphonate. A cotton fabric is impregnated with the resulting solution so that the fabric increases in weight by 75%, and is then dried.

Thereafter the fabric is impregnated with a solution at 20° C which contains, per liter, 3 grams of sodium hydroxide and 300 grams of sodium chloride, and is squeezed off to 75% weight increase; the dyeing is steamed for 30 seconds at 100° to 101° C, rinsed, soaped for quarter of an hour in an 0.3% strength boiling solution of a non-ionic detergent, rinsed and dried.

DYEING INSTRUCTION II 2 parts of the dyestuff obtainable according to Example 2 are dissolved in 100 parts of water.

The solution is added to 3,900 parts of water at 40° to 50° C, 160 parts of sodium chloride are added and 100 parts of a cotton fabric are introduced into this dyebath.

The fabric is dyed for 30 minutes at 45° C, 40 parts of trisodium phosphate are then added and the temperature is kept at 45° C for 60 minutes; the dyeing is then rinsed, soaped for 15 minutes in an 0.3% strength boiling solution of a non-ionic detergent, rinsed and dried. A wash-fast and light-fast dyeing results.

DYEING INSTRUCTION III 2 parts of the dyestuff obtained according to Example 1 are dissolved in 100 parts of water to which 5 parts of sodium chloride and 1 part of sodium hydroxide solution (36° Be) are added. A cotton fabric is impregnated with the resulting solution at 20° to 30° C so that the fabric increases in weight by 75%. The dyed cotton fabric is then stored for 20 hours at 20° C. Thereafter it is rinsed, soaped and dried. A wash-fast and light-fast dyeing is obtained.

DYEING INSTRUCTION IV 2 parts of the dyestuff obtained according to Example 1 are dissolved in 100 parts of water to which 5 parts of urea and 2 parts of sodium carbonate are added. A cotton fabric is impregnated with the resulting solution at 20° to 50° C so that the fabric increases in weight by 75%, and is dried. It is then thermofixed for 2 minutes at 140° to 210° C. Thereafter the dyeing is rinsed, soaped and dried. A wash-fast and light-fast dyeing is obtained.

PRINTING INSTRUCTION 2 parts of the dyestuff prepared according to Example 1 are sprinkled, with rapid stirring, into 100 parts of a stock thickener containing 45 parts of 5% strength sodium alginate thickener, 32 parts of water, 20 parts or urea, 1 part of sodium m-nitrobenzenesulphonate and 2 parts of sodium bicarbonate.

A cotton fabric is printed with the printing paste thus obtained on a roller printing machine and the resulting printed fabric is steamed for 2 to 4 minutes in saturated steam at 100° C. The printed fabric is then thoroughly rinsed in cold and hot water, whereby the dyestuff which has not been fixed chemically can be removed very easily from the fibre, and is then dried.

I claim:

1. A fiber-reactive dyestuff of the formula

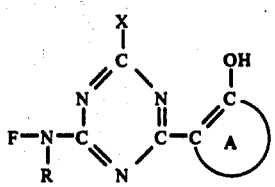

wherein

is an amino substituted azo dyestuff radical;
R is hydrogen, lower alkyl, cyclohexyl or phenyl;
and the ring A is cyclopentenyl, cyclohexenyl or cycloheptenyl.

2. A fiber-reactive dyestuff according to claim 1, wherein

is an azo dyestuff radical of the formula

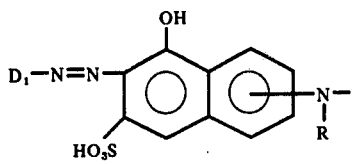

wherein
$D_1$ is sulfophenyl or sulfonaphthyl or sulfophenyl substituted by halo, alkyl, acylamino or alkoxy.

3. A fiber-reactive dyestuff according to claim 1 wherein

is a dyestuff radical of the formula

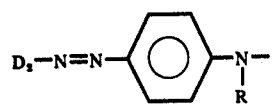

where $D_2$ is a disulfonaphthyl or stilbene group.

4. A fiber-reactive dyestuff according to claim 1 wherein

is a dyestuff radical of the formula

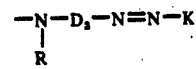

wherein $D_3$ is an azobenzene, azonapthalene, phenylazonapthalene, benzene or napthalene group and
K is a sulfonapthol, acetoacetarylide, or 5-pyrazolone group with the —OH group thereof in the ortho-position to the azo group.

5. A fiber-reactive dyestuff according to claim 1, wherein

is an azo dyestuff radical of the formula

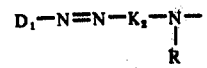

wherein $D_1$ is sulfophenyl or sulfonapthyl or sulfophenyl substituted by halo, alkyl, acylamino or alkoxy, and $K_2$ is an acetoacetarylide or 5-pyrazolone group with the —OH group thereof in the ortho-position to the azo group.

* * * * *